(12) United States Patent
McCallum et al.

(10) Patent No.: US 7,757,636 B2
(45) Date of Patent: Jul. 20, 2010

(54) ANIMAL WATERING DEVICES AND METHODS OF USE

(75) Inventors: Scott McCallum, Chilcoot, CA (US);
Sean Michael Rowe, Reno, NV (US)

(73) Assignee: Veterinary Ventures, Inc., Reno, NV (US)

( * ) Notice: Subject to any disclaimer, the term of this patent is extended or adjusted under 35 U.S.C. 154(b) by 512 days.

(21) Appl. No.: 11/558,849

(22) Filed: Nov. 10, 2006

(65) Prior Publication Data

US 2008/0078330 A1 Apr. 3, 2008

Related U.S. Application Data

(60) Provisional application No. 60/827,855, filed on Oct. 2, 2006.

(51) Int. Cl.
*A01K 7/02* (2006.01)
(52) U.S. Cl. .......................................... 119/74; 119/72
(58) Field of Classification Search ............... 119/72, 119/74, 51.5, 52.1, 61.1, 77, 78, 79, 80, 81; D30/121, 129, 130, 131, 132, 133
See application file for complete search history.

(56) References Cited

U.S. PATENT DOCUMENTS

| 1,278,285 | A | 9/1918 | Allen |
| 1,481,365 | A | 1/1924 | Ehgel |
| 2,034,968 | A | 3/1936 | Bartlett |
| 2,366,766 | A | 1/1945 | Brodsky |
| 2,510,252 | A | 6/1950 | Pine |
| 2,678,630 | A | 5/1954 | Frederickson |
| 2,726,636 | A | 12/1955 | Frederickson |
| 2,775,227 | A | 12/1956 | Millies |
| 2,877,051 | A | 3/1959 | Cushman et al. |

(Continued)

FOREIGN PATENT DOCUMENTS

DE 1098277 1/1961

(Continued)

OTHER PUBLICATIONS

"Catit Drinking Fountain and Accessories for Cats," 2p., downloaded from http://www.petsrnart.com/global/product_detail.jsp?PRODUCT%3C%Eprd_id=84552444...on Feb. 6, 2007.

(Continued)

*Primary Examiner*—T. Nguyen
(74) *Attorney, Agent, or Firm*—Holland & Hart LLP

(57) ABSTRACT

Certain embodiments provide an improved pet watering device having an easily removable debris filter. For example, the device, in some examples, has a base portion separated into a bowl and a water storage section. The filter is selectively placeable in a channel connecting the bowl and the water storage section. In further embodiments, the device includes a water dispensing portion having a spout. At least one flow guide extends along the spout and helps guide water off the spout to reduce water braiding, which may reduce noise and splashing associated with the stream of water falling from the spout. Yet further embodiments provide a pet watering device that may be easily assembled and disassembled. In one example, the upper and lower portions of the watering device are connectable with a mating tab and slot structure.

5 Claims, 10 Drawing Sheets

U.S. PATENT DOCUMENTS

| | | |
|---|---|---|
| 2,878,781 A | 3/1959 | Wingfield |
| 3,179,085 A | 4/1965 | McKillip |
| 3,228,377 A | 1/1966 | Grassano |
| 3,272,181 A | 9/1966 | Ramsey |
| 3,409,223 A | 11/1968 | Gosh |
| 3,459,159 A | 8/1969 | Reed |
| 3,505,978 A | 4/1970 | Nilsen |
| 3,537,430 A | 11/1970 | Peppler |
| 3,699,921 A | 10/1972 | Janicek |
| 3,777,714 A | 12/1973 | Danielsson |
| 3,804,064 A | 4/1974 | Kuneman et al. |
| 3,831,558 A | 8/1974 | Forbes |
| 3,868,926 A | 3/1975 | Olde |
| 3,901,191 A | 8/1975 | Smith |
| 3,903,845 A | 9/1975 | Little |
| 4,022,159 A | 5/1977 | Salvia |
| 4,098,229 A | 7/1978 | Haynes et al. |
| 4,248,177 A | 2/1981 | Peterson et al. |
| 4,347,809 A | 9/1982 | Gloggler |
| 4,351,270 A | 9/1982 | Sabin |
| 4,386,582 A | 6/1983 | Adsit |
| 4,469,049 A | 9/1984 | Waynick |
| 4,573,433 A | 3/1986 | Thompson |
| 4,584,966 A | 4/1986 | Moore |
| 4,747,538 A | 5/1988 | Dunn et al. |
| 4,807,565 A | 2/1989 | Hawthorne |
| 4,836,142 A | 6/1989 | Duback |
| 4,924,812 A | 5/1990 | Bernays |
| 4,976,220 A | 12/1990 | Gershman |
| 5,167,368 A | 12/1992 | Nash |
| 5,207,182 A | 5/1993 | Lorenzana |
| 5,326,032 A | 7/1994 | Quillin |
| 5,329,876 A | 7/1994 | Tracy |
| 5,501,178 A | 3/1996 | Kemp |
| 5,799,609 A | 9/1998 | Burns et al. |
| 5,842,437 A | 12/1998 | Burns |
| 6,055,934 A | 5/2000 | Burns et al. |

FOREIGN PATENT DOCUMENTS

| | | |
|---|---|---|
| GB | 000002308 | 10/1853 |

OTHER PUBLICATIONS

"Cat Water Fountain," 2p., downloaded from http://www.improvementscatalog.com/parent.asp?product=214041x &dept%5Fid=15120&c...on Feb. 6, 2007.

"Deluxe Fresh Flow Pet Fountain," 1p., downloaded from http://www.petmate.com/Catalog.plx?ID=205 on Feb. 6, 2007.

"Filtered Pet Waterer," 2p. downloaded from http://www.autopetfeeder.com/p_waterer.asp on Feb. 7, 2007.

"Kitty Kreek," 2p., downloaded from http://web.archive.org/web/19970306161138/http://www.titanweb.com/t...on Oct. 10, 2005.

"Kitty Kreek Instructions," 2p., downloaded from http://web.archive.org/web/19970626115728/www.titanweb.com/tranquil...on Oct. 10, 2005.

"Kitty Kreek FAQ," 1p., downloaded from http://web.archive.org/web/19970626115753/www.titanweb.com/tranquil...on Oct. 10, 2005.

ANIMAL WATERING DEVICES AND METHODS OF USE

CROSS REFERENCE TO RELATED APPLICATION

This application claims the benefit of, and incorporates by reference, U.S. Provisional Patent Application No. 60/827,855, filed Oct. 2, 2006.

TECHNICAL FIELD

The present application relates generally to watering devices for animals, such as household pets. In particular, some of the disclosed watering devices have a fountain of free falling water.

BACKGROUND

Many animals have a preference for drinking flowing water. Flowing water may provide a number of advantages, including improved taste and quality. Flowing water also typically has more dissolved oxygen, which can make the water taste better as well as potentially provide health benefits. For example, one health benefit of flowing water is that it may encourage animals to drink more liquid. Increased water intake can help reduce problems with the animal's kidneys or urinary tract. In addition to these benefits, running water is interesting and entertaining to many animals.

Many household pet owners have recognized that their pets are drawn towards running water. Many dogs like to drink from hoses, streams, or water flowing along a curb. Cats often jump on counters and sinks in order to drink from a running or leaking faucet. Some pet owners even deliberately accommodate such behavior, for example, by letting a hose or faucet drip.

However, many animals do not have access to a source of running water. Animals may engage in undesirable behavior in search of running water, such as jumping on counters or in bath tubs. Owners who do provide running water for their animals may incur significant expense by leaving faucets or hoses running.

Pet fountains that provide running water to pets have been developed in order to help alleviate some of these problems. For example, Veterinary Ventures, Inc., of Reno, Nev., offers a variety of pet fountains, such as the Drinkwell® and Drinkwell® Big Dog. Such fountains typically include a water reservoir, an elevated spout that dispenses water, and a bowl into which the water is dispensed and from which the animal can drink. Some fountains provide a stream of free falling water, which can help stimulate animals' interest in the fountain as well as enhance water oxygenation.

However, prior fountains can have some drawbacks. For example, particularly if the owner does not adequately maintain the fountain, the fountain can accumulate debris such as hair and food. Such debris can impair water circulation in the fountain, for example, by clogging an intake or outtake of a pump, or reducing water quality. If the water circulation is sufficiently impaired, a water circulation device may be damaged. In addition, some prior fountains contain pumps having at least portions that should not be in contact with water, potentially making cleaning of the fountain more difficult.

If fountains are not properly maintained, the benefits of animal watering fountains can be reduced or even reversed. However, typical fountains often have a large number of parts that need to be removed and reassembled during routine maintenance of the fountain. For example, an upper water dispensing portion is typically removable from a lower bowl portion. Reassembling this structure can be difficult for some users. Further, the water circulation device of such fountains is often not easily accessible by the user, and thus not adequately cleaned.

Although a free falling stream of water may be particularly interesting to animals, and may enhance aeration of the water, the splashing produced by such a stream can produce a level of noise objectionable to some users. In addition, the splashing can result in water landing outside the fountain, potentially making a mess or requiring the owner to refill the fountain more frequently.

Some prior fountains contain water reservoirs which can be difficult to carry and use. For example, such reservoirs may be plastic cylinders, which may become slippery when wet. In addition, many reservoirs have a lid having a spout through which water is transferred to the fountain. The reservoir is typically filled, the cap is screwed on, and then the reservoir is inverted onto the fountain. If the reservoir is not inverted properly, water may spill from the reservoir outside of the fountain.

Another potential disadvantage of prior fountains is their electric cords. Such cords are typically permanently attached to the pump, and can be difficult to position in a convenient fashion. Because of its use with water, the voltage carried by the cord can also be a concern.

In order to further improve the quality of the water provided to animals drinking from the pet fountains, some prior fountains are designed to accept filters. Such filters typically contain a quantity of an impurity-absorbing material, such as activated carbon. However, such material can have a tendency to settle into the bottom portion of the filter, reducing the effectiveness of filter, as water that circulates through other portions of the filter does not contact the absorbing material.

SUMMARY

The present application relates to watering devices for animals, such as pet fountains, and their methods of use. In particular embodiments, the watering device includes a base separated into a bowl portion and a water storage portion. A filter is positioned intermediate the bowl portion and the water storage portion. In particular configurations, the filter is removable, which can facilitate maintenance. The base includes filter guides, in particular examples, that aid in removing and inserting the filter. In certain implementations, the watering device includes a second filter. For example, the second filter may be a filter associated with a water circulation device, such as a pump.

Further embodiments are directed to an animal watering device that includes a base, a water circulation device, and a flow restriction mechanism. The flow restriction mechanism includes a flow control knob coupled to a shaft. At least a portion of the shaft is in fluid communication with at least a portion of the water circulation device. In a particular example, the shaft is in communication with an adjustable flow opening. Moving the knob adjusts the size of the flow opening and thus adjusts the flow of water entering the water circulation device.

In particular configurations, the base includes a bowl portion and a water recirculation portion. In a more particular configuration, the watering device includes a filter positionable between the bowl portion and the recirculation portion, as described above. When the device includes a flow restriction mechanism which includes a shaft, the shaft may extend from the bowl portion to the recirculation portion. In more particular examples, the filter includes an aperture through which the shaft is configured to pass.

In some aspects, the present disclosure provides animal watering devices having removable water reservoirs. In particular implementations, the water reservoir has a gripping surface. For example, the water reservoir may have a gripping indention, such as an indention formed in a side of the reservoir.

In further aspects, the reservoir includes a water dispensing structure with a flow restricting structure configured to selectively prevent water from flowing out of the reservoir. In one example, the reservoir includes a plug having a shaft extending towards the bottom of the watering device when in an operating orientation. When the reservoir is placed in an operating position with respect to a base portion of the watering device, the shaft pushes the plug so as to allow water to flow from the reservoir into the base portion. When not resting on the base, the plug seals an opening in the reservoir, restricting the flow of water from the reservoir.

In further configurations, the reservoir may be selectively secured to the base, such as by an interlocking mechanism. In a specific example, the interlocking mechanism is formed by a tongue and groove. Selectively securing the reservoir to the base may allow a greater variety of reservoir shapes and configurations to be used with the animal watering device. In addition, such mounting structures may aid in attaching the reservoir to the base and help prevent accidental removal of the reservoir from the base.

Certain embodiments of the animal watering device include an upper portion and a bottom portion. The upper portion may be, for example, a water dispensing portion. The bottom portion, in some examples, includes a bowl. The animal watering device includes an assembly guide to aid in attaching the upper portion to the bottom portion. In a particular implementation, the assembly guide is a guide-tab configured to be received in a mating guide-slot. In more specific examples, the guide-tab is formed in the upper portion of the animal water device and the guide-slot is formed into the lower portion of the animal watering device.

In additional embodiments, the present disclosure provides animal watering devices that can produce water streams that are quieter and result in less splashing than prior watering devices. In some implementations, the devices include a water dispensing portion. The water dispensing portion includes a tank portion and a spout. In particular examples, the spout is of at least substantially the same length as the side of the dispensing portion from which the spout extends. In further implementations, the lip of the spout is turned. In yet further implementations, the spout has sections with different slopes or curves. In some examples, the spout is curved and has a plurality of inflection points. In further configurations, the tank or spout has smooth or rounded surfaces, such as those produced by an injection molding process. In some implementations, the longitudinal surface of the spout is angled or curved as it extends from a lower portion of a water dispensing portion to an upper portion of the water dispensing portion.

Some embodiment of the water dispensing portion further include at least one flow guide. In a particular example, the water dispensing portion includes two flow guides extending along opposing sides of the tank. For example, the flow guides are angled towards the edge of a spout and define a spout opening. In one example, the flow guides extend along such curve or angle.

These embodiments can reduce braiding of a water stream, such as a water stream that flows off a spout. Such braiding can create a more turbulent flow of water, which can lead to increased noise and splashing. Accordingly, embodiments of the present disclosure can provide animal watering devices that produce less splashing or which operate more quietly.

In particular aspects, the present disclosure provides animal watering devices having improved pump or cord structures. These improved structures can facilitate assembly, disassembly, or maintenance of the animal watering devices. In particular configurations, disclosed animal watering devices include a pump disposed in the interior of a base. In some examples, the pump is submersible. The base includes, in some implementations, pump guides to aid in positioning the pump and to help secure the pump during operation. The pump guides are, in some examples, mounting pegs extending vertically from a bottom of the animal watering device.

The pump includes a power cord. In some implementations, the power cord is separable into an outlet portion and a pump portion by disconnecting an inline plug. Detaching the outlet portion from the pump portion can facilitate cleaning of the pump or other portions of the animal watering device. For example, the inline plug may aid in removing the pump for cleaning, maintenance, or replacement, without needing to disassemble the remainder of the animal watering device.

In certain embodiments, the pump power cords of disclosed animal watering devices contain further features. For example, particular implementations include a power cord having a length configured for use with the animal watering device. Certain prior watering devices have cords that were too short for some placements, or that were so long as to provide an undesirable amount of unused cord. Disclosed embodiments provide cords that are sufficiently long to allow the animal watering device to be conveniently placed, but are not excessively long.

In further implementations, the power supply cord to the pump is a low voltage cord, which can improve the safety of the device, such as if the cord becomes cut or abraded, contacts water, or is chewed by an animal.

In further aspects, the animal watering device includes a securing structure for a power cord. For example, the animal watering device, in particular implementations, includes a cord guide or maze through which the cord may be threaded in order to secure the cord. In particular embodiments, the cord guide is located on an underside of the animal watering unit. In one implementation, the cord guide includes a channel having a plurality of alternating projections. The cord may be secured by placing it in between a side of the channel and each of the projections.

In some embodiments, disclosed watering devices can be used with a filter. Particular implementations include a filter guide, such as a filter guide associated with a water dispensing portion of the watering device. In a specific example, the filter guide is formed from opposing triangular slots formed in opposing sides of the water dispensing portion.

The present disclosure provides improved filters, such as improved filters useable with disclosed animal watering devices. Such disclosed filters include first and second filtering surfaces. In particular implementations, the first and second filtering surfaces are planar. In particular examples, the first and second filtering surfaces are at least substantially rectangular. A quantity of filter media, such as activated carbon, is placed between the first and second filtering surfaces. The filter includes one or more barriers that divide the filter into a plurality of sections. The filter may be divided into any suitable number of sections, such as 2, 4, 6, or 8 sections. In a particular example, the filter is divided into 6 co-planar sections. The sections may be of the same or different sizes. The sections may be formed by any suitable means, such as by introducing a liquid material into the filter material that hardens into a suitable barrier section. Dividing the filtering surface into multiple compartments may prevent filter media from falling or settling to the bottom of the filter. Accordingly, water flowing through the filter will more evenly contact filter media, thus potentially increasing the filter's efficiency and enhancing water quality.

In yet further embodiments, the present disclosure provides pet watering devices which include a lighting feature. Some implementations include at least one light positioned to illuminate at least a portion of the watering device, such as a water reservoir. In some examples, the light is an LED light. In further examples, the light is coupled to a pump, such as an LED bearing structure connected to the pump by a wire. The lights may be clear or colored and may be static or may move or change color.

The water reservoir, or other portion of the watering device illuminated by the light, may be configured to interact with the light in a particular manner, such as having reflective surfaces, colored surfaces, or diffusive surfaces. In particular examples, the illuminated portion has a clear, transparent, or translucent surface.

Additional light features may be operatively coupled to the light. In a particular example, at least one fiber optic element, such as a fiberglass thread, is in optical communication with the light. In some examples, the additional light features move relative to the light. In other examples, the light moves relative to the additional light feature. In yet other examples both the light and additional light feature are stationary. When the light or light feature is movable, actuation can be by a water pump or another mechanism. The water reservoir, or other portion of the watering device, may be shaped to facilitate placement or positioning or a light and/or light feature, for example, to point a LED or thread fiber-optic elements. The watering device, in some implementations, includes a housing or mount for receiving the light or additional light feature. In a particular example, a mount extends from a base portion of the watering device located below a reservoir.

There are additional features and advantages of the subject matter described herein. They will become apparent as this specification proceeds.

In this regard, it is to be understood that this is a brief summary of varying aspects of the subject matter described herein. The various features described in this section and below for various embodiments may be used in combination or separately. Any particular embodiment need not provide all features noted above, nor solve all problems or address all issues in the prior art noted above.

BRIEF DESCRIPTION OF THE DRAWINGS

Various embodiments are shown and described in connection with the following drawings in which.

DETAILED DESCRIPTION

Unless otherwise explained, all technical and scientific terms used herein have the same meaning as commonly understood by one of ordinary skill in the art to which this disclosure belongs. In case of conflict, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together. Although methods and materials similar or equivalent to those described herein can be used in the practice or testing of the present disclosure, suitable methods and materials are described herein. The disclosed materials, methods, and examples are illustrative only and not intended to be limiting.

Figure 1A:
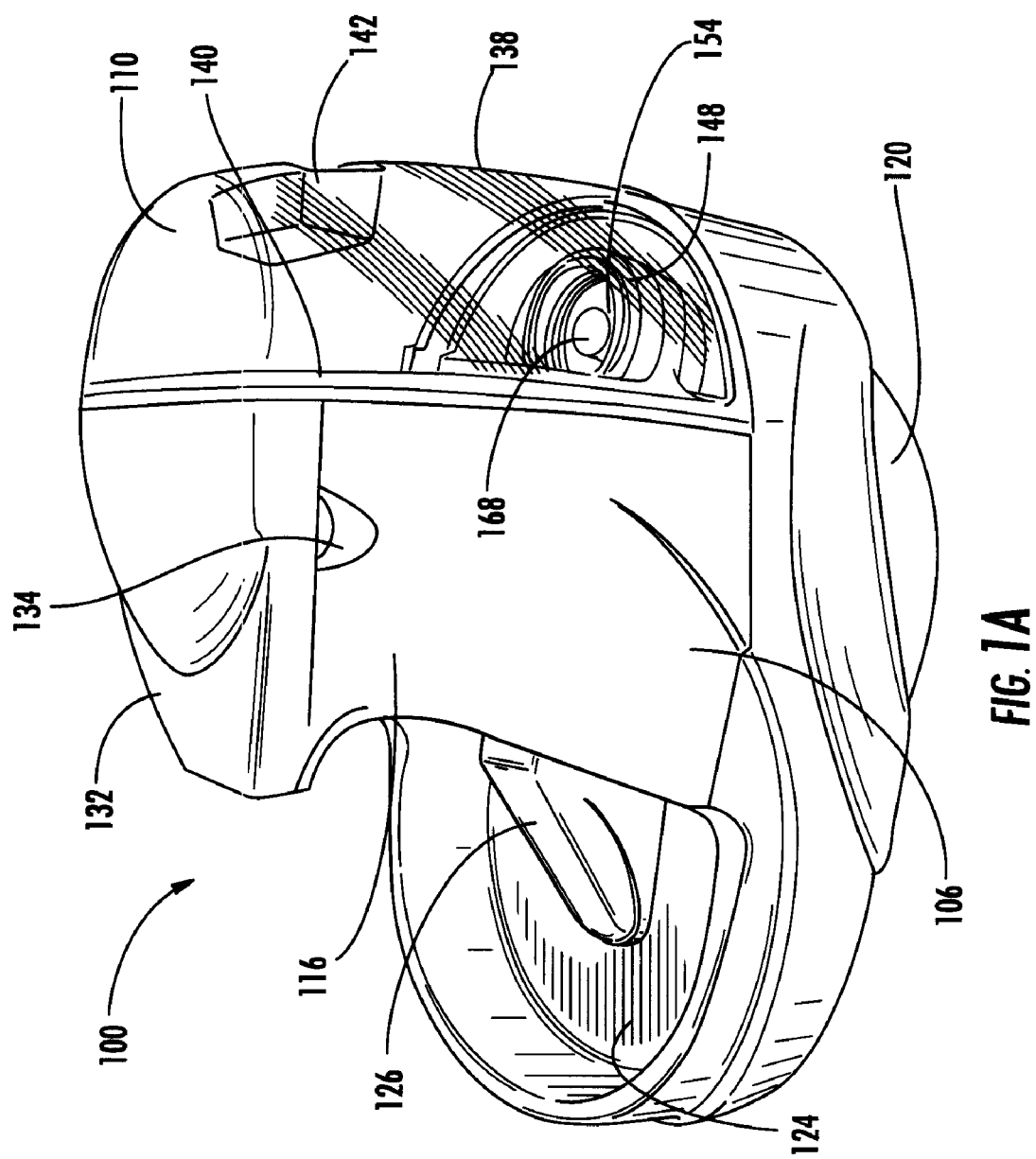
FIG. 1A is a side elevational view of an animal watering device according to the present disclosure.

FIG. 1A illustrates an animal watering device 100 according to an embodiment of the present disclosure. The device 100 includes a base 106 and a reservoir 110. The base 106 is formed from a generally trapezoidal upper water dispensing portion 116 and a generally elliptical lower water receiving portion 120. The water receiving portion 120 includes a generally circular bowl 124. The bowl 124 includes a water dispersing structure 126. The water dispersing structure 126 is a ramp generally in the shape of a triangular prism, with two parallel planar sides and a rounded apex. Other shapes may be used for the upper water dispensing portion 116, the water receiving portion 120, the bowl 124, and/or the water dispersing structure 126. Some embodiments of the device 100 omit the water dispersing structure 126 or the reservoir 110. For example, the device 100 may have a ramp or flow guide in fluid communication with the water dispensing portion 116.

The upper water dispensing portion 116 is covered by a lid 132. Conical indentions 134 are formed at the top of each longitudinal side of the upper dispensing portion 116, proximate the lid 132. The indentions 134 may be shaped differently or located elsewhere along the upper dispensing portion 116. Particular examples of the device 100 omit the indentions 134.

The reservoir 110 is generally half parabolic in cross-section, having an arcuate outer surface 138 and a generally planar inner surface 140. In further examples, the reservoir 110 is shaped differently.

Figure 1B:
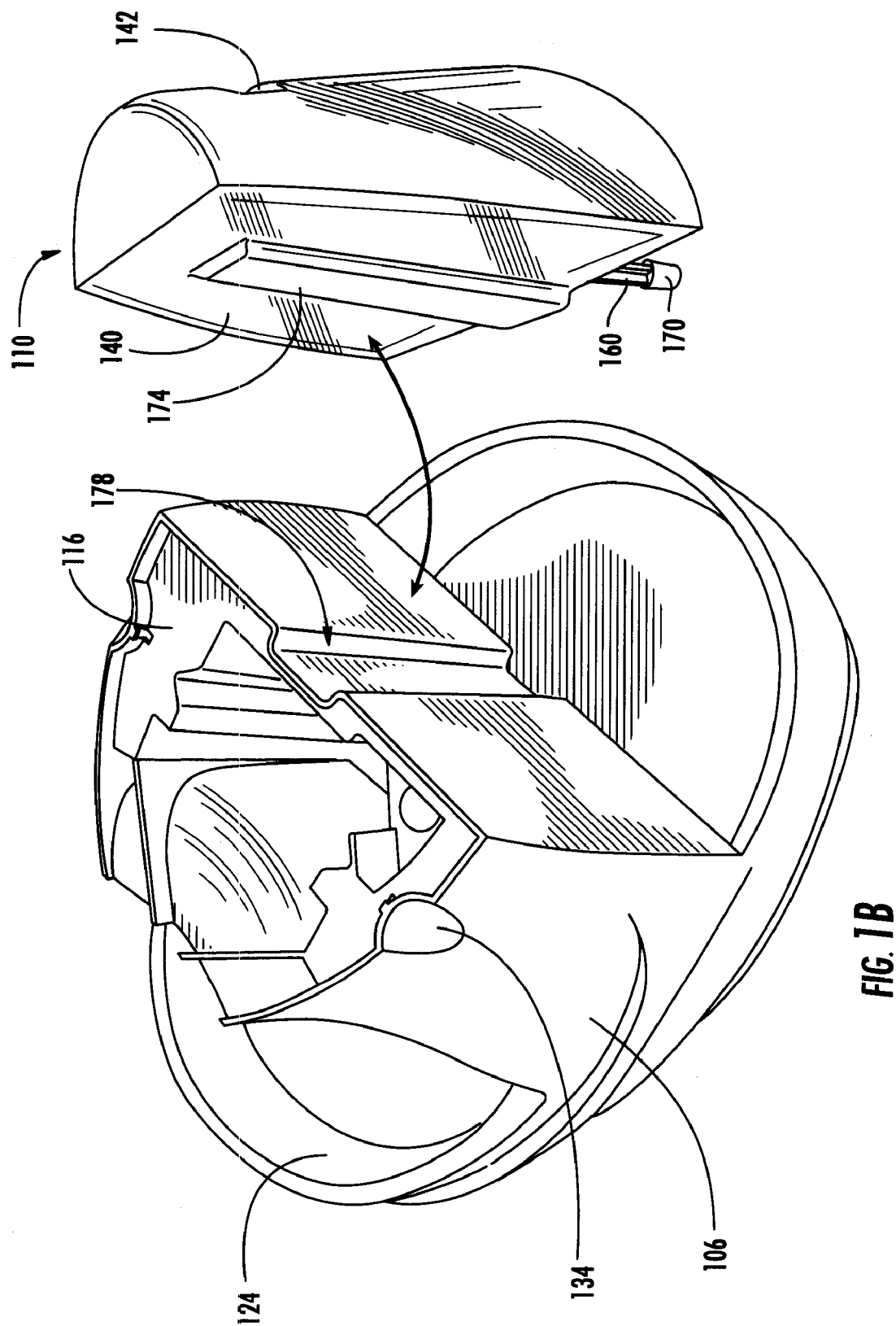
FIG. 1B is a perspective view of the device of FIG. 1A showing a reservoir portion removed from an interlocking relationship with a base portion.

FIG. 1B presents an alternate view of the reservoir 110 and the base 106. The inner surface 140 of the reservoir 110 includes a longitudinally extending rectangular protrusion, or tongue, 174. The tongue 174 protrudes outwardly from the reservoir 110 and is generally centered in the inner surface 140. The tongue 174 is configured to be received by a mating groove 178 formed in an outer surface of the water dispensing portion 116. The groove 178 is approximately centered in the outer surface and extends along most of the length of the outer surface. The tongue 174 and groove 178 may be positioned differently on the reservoir 110 and base 106, including being horizontally oriented. Further embodiments of the device 100 use an alternative interlocking mechanism to secure the reservoir 110 to the base 106. For example, the reservoir 110 may be secured to the base 106 by a tab and slot mechanism.

Figure 1C:
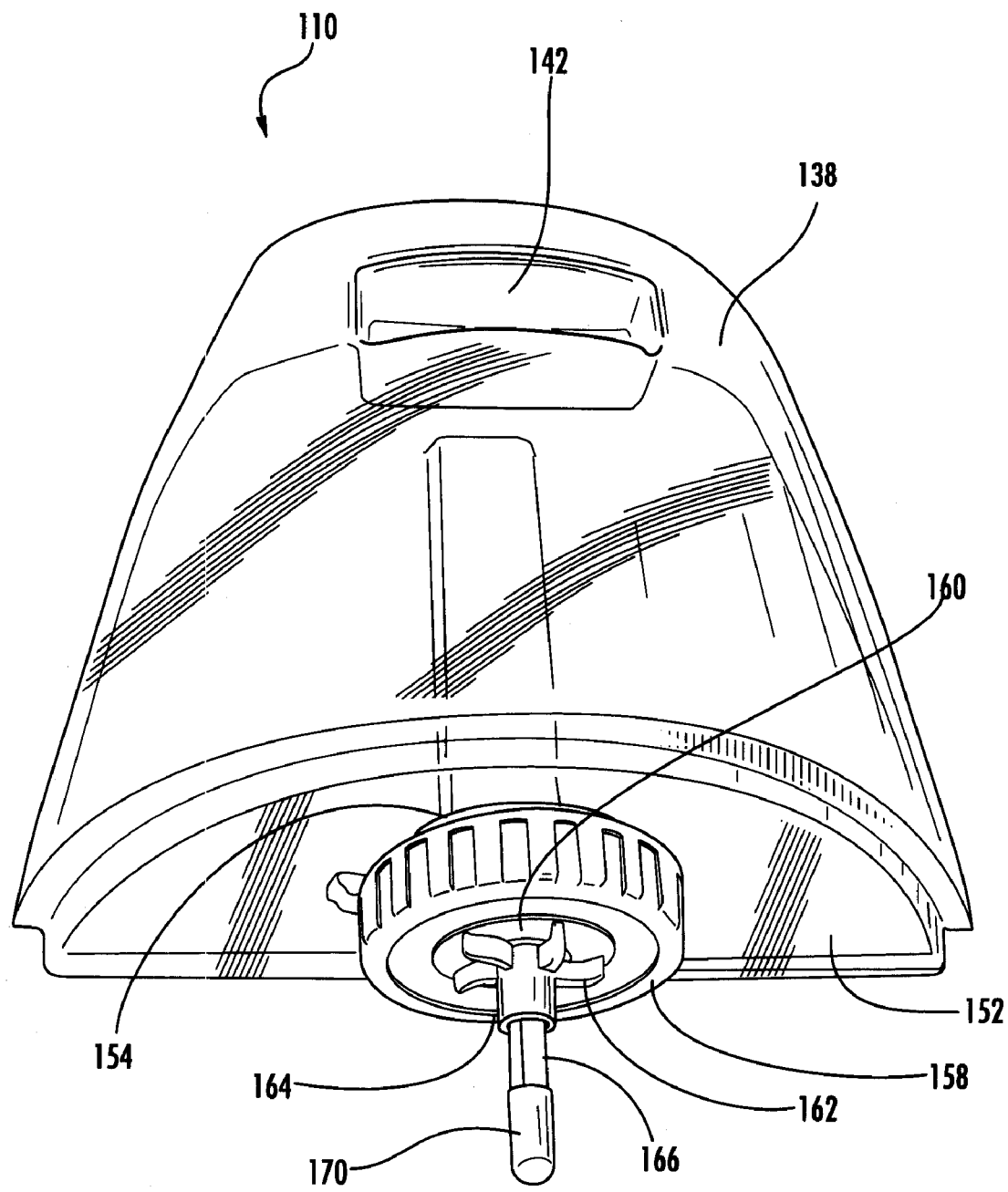
FIG. 1C is a back elevational view of a water dispensing portion of the device of FIG. 1A.

With reference now to FIG. 1C, a generally rectangular indention 142 is formed near the apex of the outer surface 138 of the reservoir 110. A circular opening 148 (FIG. 1A) is formed on the bottom 152 of the reservoir 110. A circular rim 154 projects outwardly from the circular opening 148. The rim 154 contains threads (not shown). The threads are received by mating threads (not shown) on a cap 158. The cap 158 includes an opening 160. A plurality of arcuate arms 162 extend from the cap 158 over the opening 160 and into a collar 164. A shaft 166 extends through the collar 164. A circular plate 168 (FIG. 1A) extends perpendicularly from the upper end of the shaft 166. The lower end 170 of the shaft 166 is rounded. In further examples the reservoir 110 is constructed differently. For example, the reservoir 110 is constructed, in some embodiments, with a carrying handle protruding from a surface of the reservoir 110. Yet further embodiments omit the handle 142.

With reference to FIGS. 1A and 1B, in operation, water falls from the upper water dispensing portion 116 onto the ramp 126 and collects in the bowl 124. The ramp 126 is a water dispersing structure that can be used to reduce splash and noise associated with a stream of water falling from the upper water dispensing portion 116 into the bowl 124. The water in the bowl 124 is recirculated to the upper water dispensing portion 116. The water supply is provided by the reservoir 110. Although described as having a free-falling stream of water, certain embodiments of the present disclosure can be constructed without such a stream of water, such as having a channel or ramp that conducts a stream or water or a having bubbler or a similar mechanism. In addition, some embodiments of the device 100 do not have a dispersing structure 126.

The rectangular indention 142 in the reservoir 110 provides a carrying handle to aid a user in carrying, inserting, and removing the reservoir 110. A user can unscrew the cap 158 in order to expose the opening 148 and allow the reservoir 110 to be more easily filled with liquid. When the reservoir 110 is in use with the base 106, the rounded portion 170 of the shaft 166 abuts the bottom of the base 106, forcing the shaft 166 upwards through the collar 164, and moving the plate 168 away from the aperture 160, thus allowing water to flow from the reservoir 110 into the base 106. When the reservoir 110 is removed from the base 106, water pressure on the plate 168 forces the plate 168 and the shaft 166 downward such that the plate 168 blocks the aperture 160, thus preventing water from leaving the reservoir 110.

The tongue 174 and groove 178 aid in removing the reservoir 110 from the water dispensing portion 116 and in placing the reservoir 110 back on the water dispensing portion 116. The tongue 174 and grove 178 also aid in securing the reservoir 110 to the base 106, adding stability when the reservoir 110 is in place by limiting lateral motion of the reservoir 110. Securing the reservoir 110 to the base 106 can allow a variety of reservoir shapes to be used, rather than being limited to more structurally stable shapes, such as symmetrical shapes.

A user can remove the lid 132 by inserting fingers into the conical indentions 134 formed in the longitudinal sides of the water dispensing portion.

The components of the animal watering device 100 can be constructed from one or more suitable materials. For example, the base 106 may be made of plastic and formed by any suitable process, such as injection molding. The base 106 may be constructed as one piece, two pieces (such as the upper water dispensing portion 116 and water receiving portion 120, as shown), or more than two pieces.

The reservoir 110 may be constructed from suitable materials, by any suitable process, and may be composed of one or more pieces. For example, the reservoir 110 may be made of plastic. In a particular example, the reservoir 110 is formed from two pieces, such as the outer surface 138 and planar inner surface 140. The outer surface 138 and the inner surface 140 can be joined by any suitable means. For example, the pieces can be joined by an adhesive or by welding. In a particular example, the outer surface 138 and the inner surface 140 are ultrasonically welded. In some implementations, the reservoir 110 is dishwasher safe.

Figure 2A:
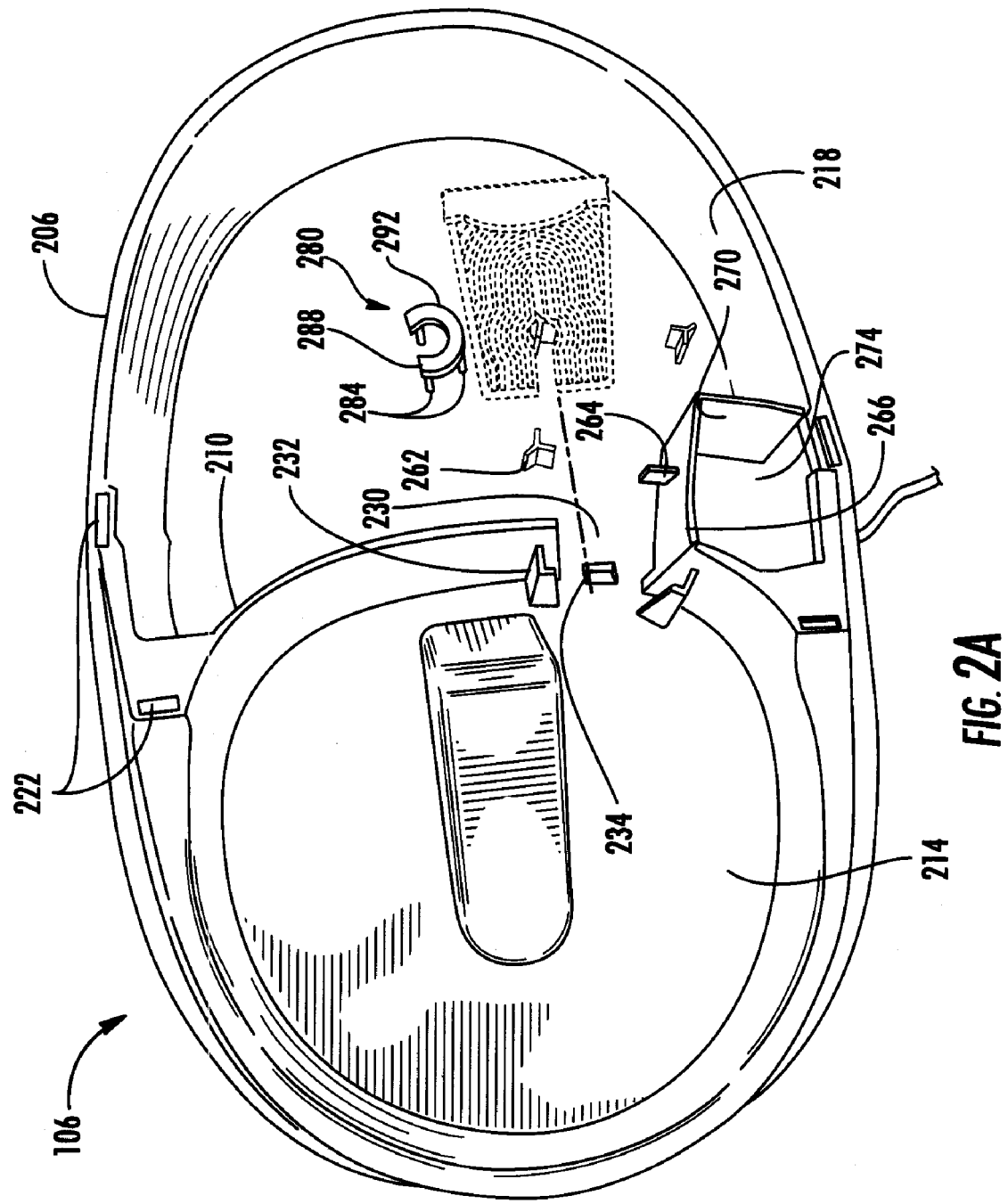
FIG. 2A is a top elevational view of components of a water receiving portion of the device of FIG. 1A.

As shown in FIG. 2A, the base 106 includes a generally elliptical outer rim 206. An inner wall 210 divides the base 106 into a generally circular bowl portion 214 and a generally half-elliptical water storage section 218. A plurality of mounting apertures 222 are formed approximately in the middle of each longitudinal side of the outer rim 206. Further embodiments are shaped differently. Yet further embodiments have an inner wall 210 positioned other than as shown in FIG. 2A or omit the inner wall 210. Similarly, the mounting apertures 222 are omitted in some examples.

A mounting slot 230 is formed in the inner wall 210. Filter guide tabs 232 extend vertically down, and slightly offset from, the mounting slot 230. The filter guide tabs 232 have a generally "L"-shaped cross-section. A flow shaft support 234 extends upwardly from the bottom of the bowl portion 214 intermediate the walls of the mounting slot 230. In some embodiments, the flow shaft support 234 or slot 230 is omitted or constructed differently than shown in FIG. 2A.

In particular embodiments, the device 100 includes a mount or housing for a lighting feature. In FIG. 2A, a mount 280 extends upwardly from the bottom of the water storage section 218. The mount 280 includes legs 284 supporting a semi-circular shelf 288. A rim 292 extends upwardly from the shelf 288. A cord for a lighting feature can be inserted through the opening of the shelf 288, with the lighting feature resting on the shelf 288 and positioned by the rim 292. Of course, the mount 280 may be located elsewhere on the device 100 and may be constructed differently. For example, different shapes of mounts and housing in the devices fit different shapes of lights.

Figure 2B:
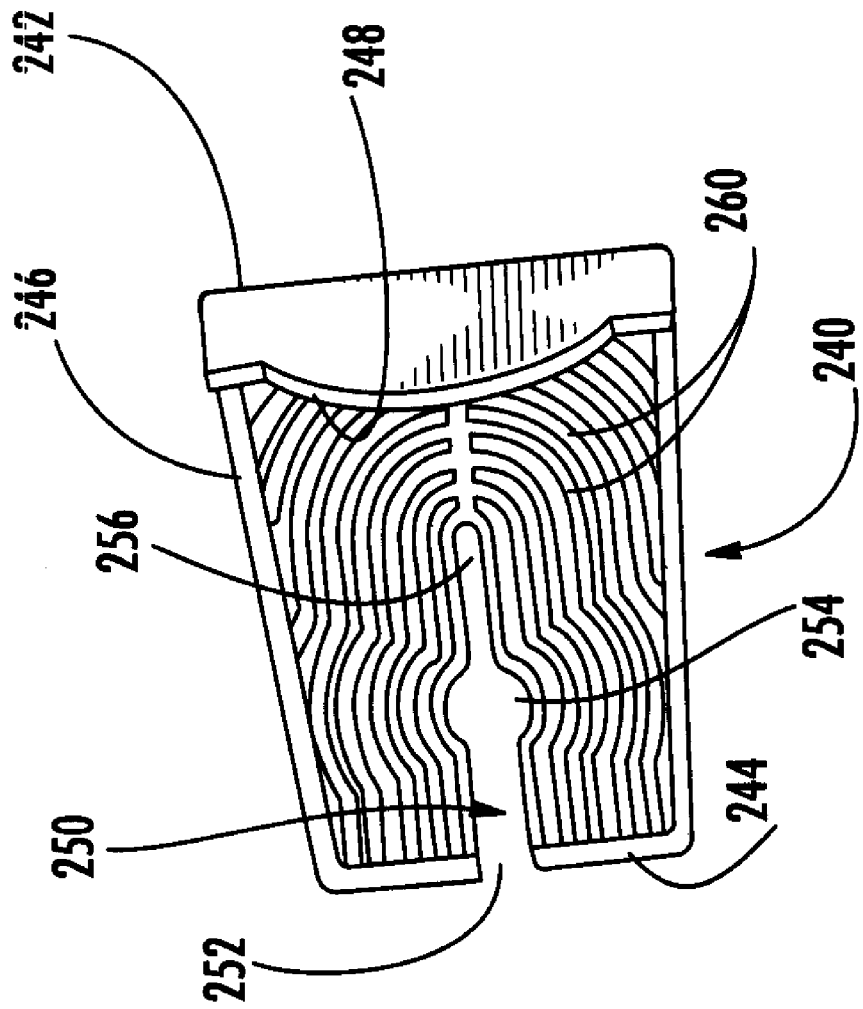
FIG. 2B is a perspective view of a debris filter that can be used with the device of FIG. 1A.

With reference to FIG. 2B, a debris filter 240 is insertable in the filter guide tabs 232, proximate the mounting slot 230. The debris filer 240 is trapezoidal, having parallel top 242 and bottom 244 sides and two lateral sides 246 inclined towards one another as they approach the bottom side 244. A semicircular gripping tab 248 extends perpendicularly from the top side 242 of the filter 240. A shaft mounting slot 250 extends from the bottom side 244 to the interior of the filter 240, slightly beyond the center of the filter 240. The slot 250 is generally key-shaped, having a rectangular portion 252 proximate the bottom side 244, a central circular portion 254, and a half obround portion 256 extending upwardly from the central circular portion 254. A series of spaced apart concentric key shaped members 260 extend from the shaft mounting slot 250 to the sides 242, 244, 246 of the filter.

In some embodiments the filter 240 is shaped differently or is mountable to the base 106 in a different manner. For example, the filter 240 can be secured to the base 106 by a clip or other fastener.

Returning to FIG. 2A, the water storage section 218 includes pump mounting pegs 262 upwardly extending from the bottom of the water storage section 218. The pump mounting pegs 262 have generally "y" shaped cross sections and are located at three corners of a parallelogram. A pump guide tab 264 extends perpendicularly from the bottom portion of an inner cord passage wall 266. In further embodiments the pump guide tabs 232 are omitted or the pump is retained in the base 106 by another structure. For example, the base 106 may include an enclosure to house a pump.

The inner cord passage wall 266, a portion of the inner wall 210 adjacent the mounting slot 230, a portion of the outer wall 206, and a wall 270 generally transverse to the inner cord passage wall 266 define a cord passage 274. The cord passage 274 defines an opening in the bottom of the water storage section 218 through which a cord reaches the pump. In some examples the cord passage is located elsewhere or is omitted. In a particular example, at least a portion of the pump is located exteriorly to the base 106. In such examples, the power supply to the cord may also be located exteriorly to the base 106.

Figure 5:
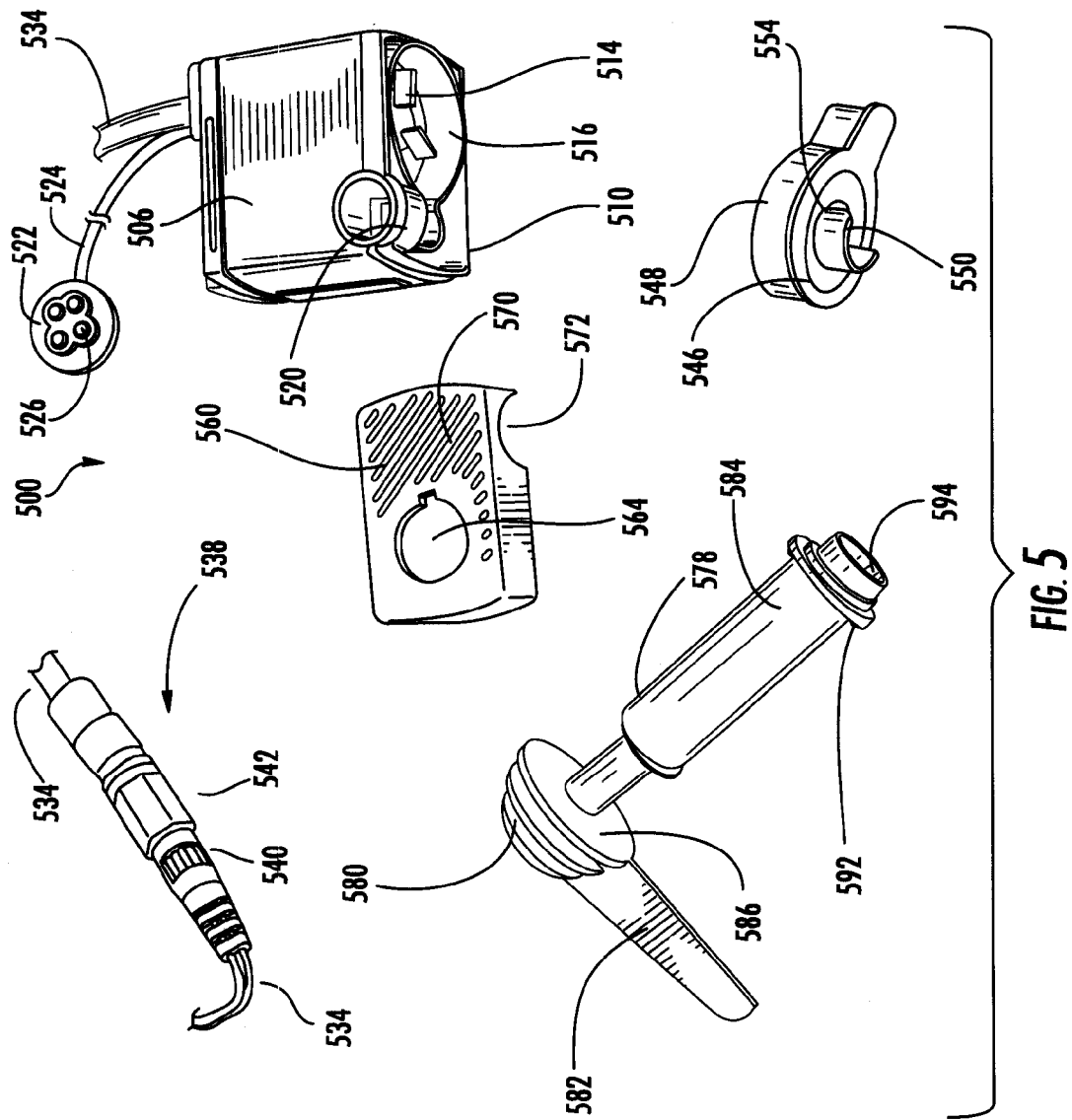
FIG. 5 is an elevational view of components of a water circulation system that can be used in the device of FIG. 1A.

A pump fits within the pump mounting pegs 262 and the pump guide tab 264. In particular examples, the pump is submersible, such as model PP-333LV, available from Jebao Co., of Dongsheng, China. In further examples, the pump is not submersible. Particular embodiments of the pump include a flow control mechanism (not shown), an example of a flow control mechanism useable in some embodiments of the present disclosure is shown in FIG. 5. Some implementations of the flow control mechanism for the pump include a shaft extending through the mounting slot 230. A portion of the shaft rests on the support 234. One end of the shaft ends in a flow control knob and the other end of the shaft engages the pump.

Figure 3A:
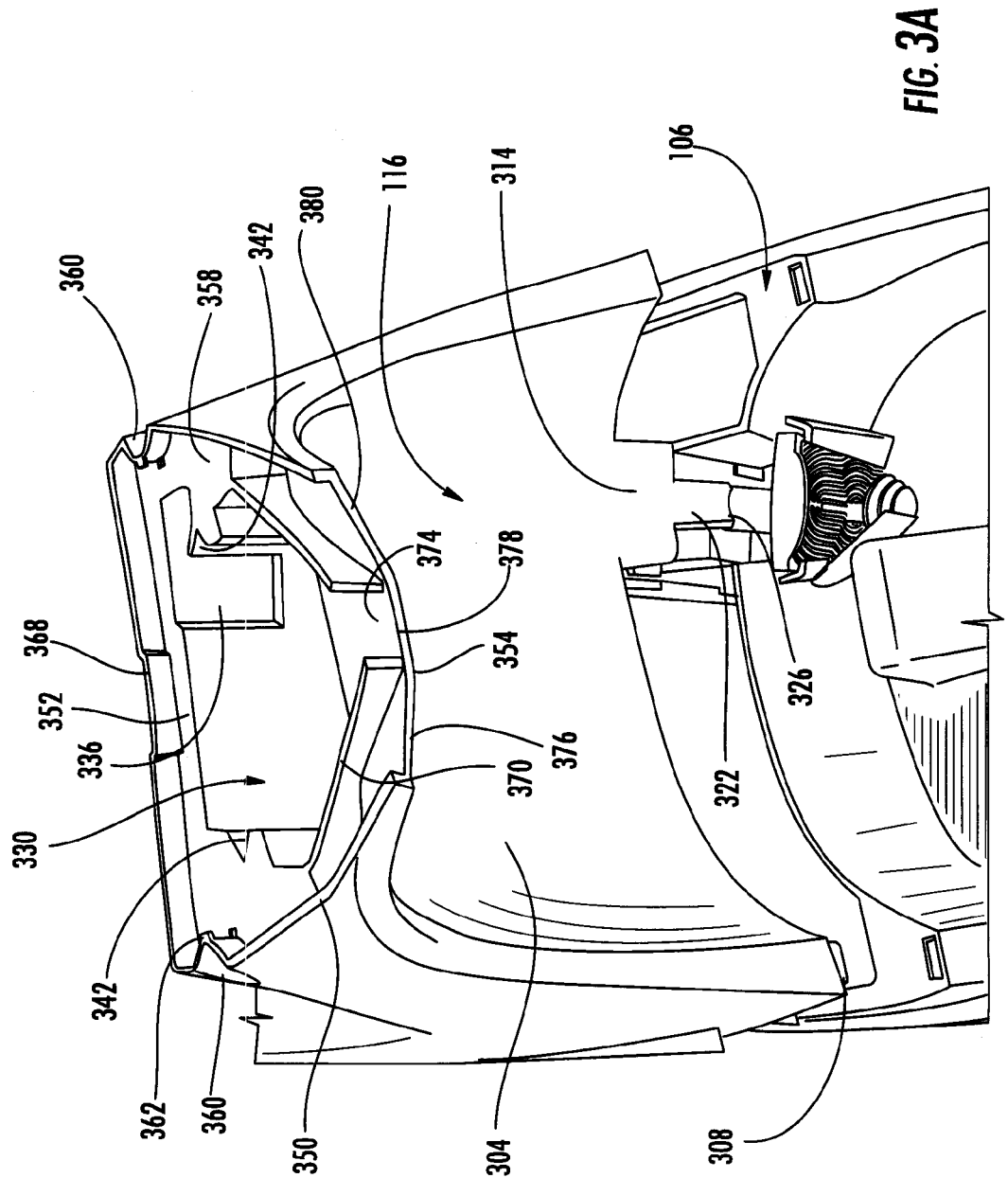
FIG. 3A is a front elevational view of the components of a water dispensing portion of the device of FIG. 1A.

FIG. 3A illustrates the upper dispensing portion 116 of the base 106 of the animal watering device 100. The upper water dispensing portion 116 is generally rectangular and includes a concave inner arcuate portion 304. Mounting tabs 308 extend from the ends of the arcuate portion 304 and from each transverse side of the water dispensing portion 116. The water dispensing portion 116 may be shaped differently, or attached to the remainder of the base 106 in other manners.

A guide tab 314 extends downwardly a bottom side of the water dispensing portion 116. The guide tab 314 is generally rectangular, with the lateral sides being slightly inclined towards one another. The bottom corners of the guide tab 314 are rounded. A flow shaft support tab 322 extends from the center of the bottom side of the guide tab 314. The shaft support tab 322 is also generally rectangular, having lateral sides inclined slightly towards one another. The extending end 326 of the shaft support tab 322 is concave and is curved and sized to abut the flow shaft of the flow control mechanism (FIG. 5). In further embodiments the guide tab 314 is omitted, shaped differently, or another structure used to connect the water dispensing portion 116 to the remainder of the base 106.

The water dispensing portion 116 includes a tank 330. A water inlet pipe (not shown in FIG. 3A) extends from the bottom of the water dispensing portion 116 and is in communication with the pump and a water feed aperture formed in an upper corner of the tank 330. The water feed aperture is located at the bottom of a well 336. A flow opening is formed in one wall of the well 336. Two generally triangular filter retention slots 342 are formed in each transverse side of the tank 330 for receiving an impurity absorbing filter (not shown). The apex of each triangular slot 342 is rounded. The tank 330 or filter retention slots 342 are omitted in some embodiments of the device 100.

The upper end of the watering dispensing portion 116 includes two arcuate transverse sides 350, a longitudinal side 352, and a spout 354. The transverse sides 350 and longitudinal side 352 form an upper rim. A shelf 358 extends along the longitudinal side 352 and rear portions of the transverse sides 350. A rear portion of each transverse side 350 includes a convex semicircular indention 360. The inside portion of each indention 360 includes an outwardly extending locking tab 362. A locking slot is formed in the shelf 358 proximate the apex of the indention 360. The indentions 360 form the upper edge of ellipsoid depressions formed in the transverse sides of the water dispensing portion 116. The longitudinal side 352 has a centrally located, generally U-shaped indention 368, which is the upper end of a reservoir mounting channel (not shown in FIG. 2A, groove 178 of FIG. 1B). The upper end of the water dispensing portion 116 is shaped differently in further embodiments.

The arcuate side 304 of the water dispensing portion 116 is concavely curved towards the upper end of the water dispensing portion 116. The upper edge of the arcuate side 304 forms the spout 354. Two flow guides 370 extend from the upper portion of the inside of the arcuate side 304. The flow guides 370 extend upwardly from the upper surface of the spout 354. The flow guides 370 are linear and inclined towards one another, defining a spout opening 374. In further embodiments of the device 100 the flow guides are shaped or positioned differently. The flow guides are omitted in some implementations.

The spout 354 is arcuate, having multiple inflection points 376, 378, 380. The inflection points 376, 378, 380 define concavely curved portions on the sides of a convexly curved portion central portion of the spout 354. In some embodiments the spout 354 is shaped differently, such as being linear.

Figure 3B:
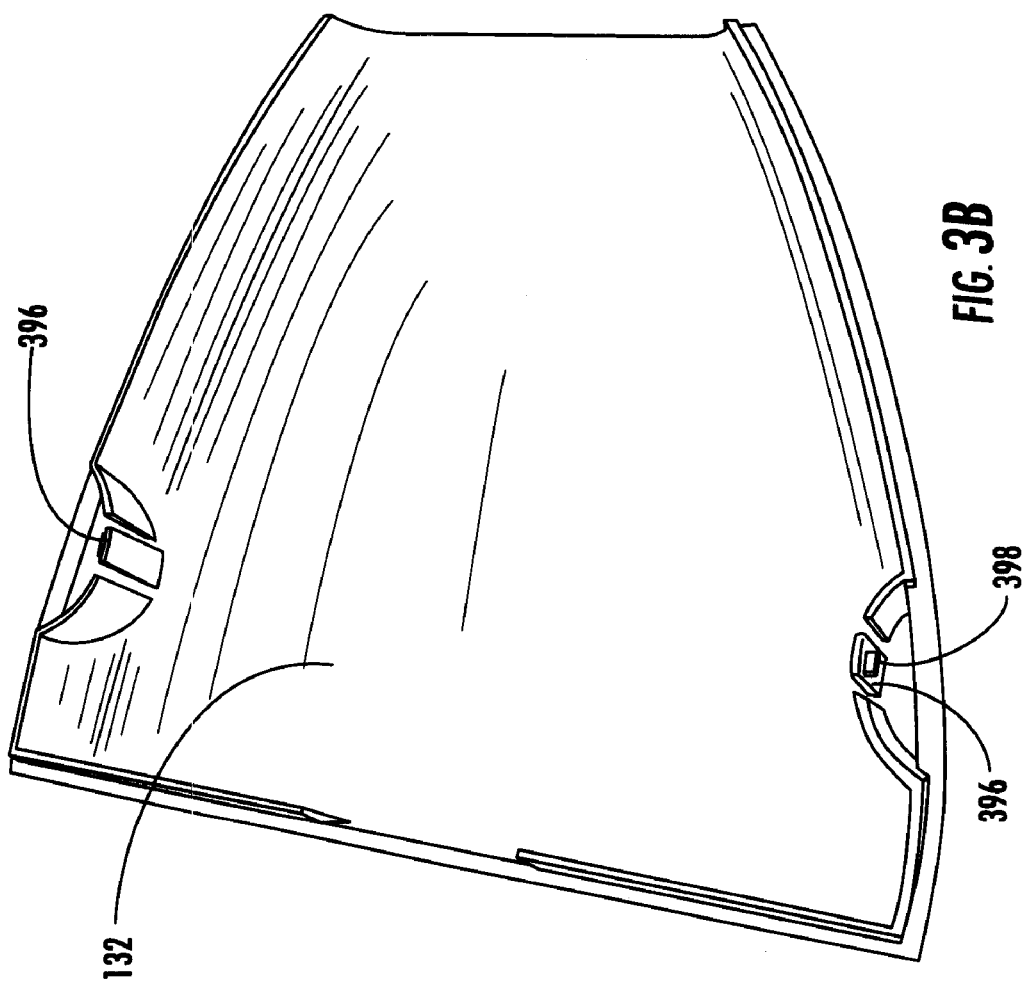
FIG. 3B is a bottom elevational view of a lid for a water dispensing portion of the device of FIG. 1A.

Referring to FIG. 3B, the lid 132 is attachable to the upper end of the water dispensing portion 116. The lid 132 is generally parabolic, having arcuate longitudinal sides and straight transverse sides. A ridge extends along the underside of the lid 132. The ridge includes semicircular indentions towards the rear end of the lid 132. The indentions extend from the ridge to the underside of the lid 132. Vertical rectangular openings along the indentions define a central locking lab 396. The locking tabs 396 include outwardly extending prongs 398 slightly offset from the bottom of each locking tab 396. The portion of the ridge along the rear end includes a central rectangular opening. The lid 132 may be shaped differently or attached to the water dispensing portion 116 in an alternative manner. In a particular example, the lid 132 is not removable from the water dispensing portion 116.

With reference to FIGS. 2A, 2B, and 3A, the upper water dispensing portion 116 can be attached, or detached from, the remainder of the base 106 by inserting or removing the mounting tabs 308 from the mounting apertures 222. In order to aid in positioning the upper water dispensing portion 116 with respect to the base 106, the guide tab 314 is inserted through the mounting slot 230.

A flow control mechanism may be positioned longitudinally between the bowl 214 and the water storage section 218. When the upper water dispensing portion 116 is attached to the base 106, a shaft of the flow control mechanism is supported and secured by the flow shaft support 234 and the transverse end 326 of the shaft support tab 322 of the guide tab 314.

The debris filter 240 can be inserted or removed from the filter guide tabs 232. The debris filter 240 may fit over a shaft of the flow control mechanism by inserting the shaft mounting slot 250 over the shaft of the flow control mechanism. The debris filter 240, when in place, helps prevent hair, grass, food, or other debris from entering the pump. Because the debris filter 240 may be easily removed, cleaned, and put back, it may encourage more frequent cleaning, thus aiding in keeping the animal watering device 100 clean and potentially improving water quality and performance of the animal watering device 100.

When in use, water passes through the concentric key shaped members 260 and on either side of the shaft support tab 322 into the water storage section 218 where it can be injected by the pump into a water intake conduit in communication with the water feed aperture of the well 336. The amount of water entering the pump may be controlled by a user with the flow control mechanism. For example, the user can rotate the flow control mechanism by gripping and turning a handle attached to a flow control knob (see FIG. 5).

The pump is secured within the water storage section 218 by the pump mounting pegs 262 and the tab 264. However, the pump may be easily removed by a user, aiding in cleaning and maintenance of the pump. The cord for the pump can reach the pump through the cord passage 274. The cord passage 274 also allows the cord to be easily moved in order to insert or remove the pump from the water storage section 218.

A second filter (not shown in FIG. 2A, 2B, or 3A) for absorbing impurities in water may be inserted into the filter retention slots 342 of the tank 330. In operation, water enters the tank 330 through the water feed aperture. Water passes from the well 336 into the tank 330 through a flow opening. If a second filter is in use with the tank 330, the water passes through the second filter and rises up the inside of the water dispensing portion 116. As the water rises, it is funneled into the spout opening 374 by the flow guides 370. The water then flows over the convex central portion of the spout 354 and falls in a stream into the bowl 214. The flow guides 370 and arcuate shape of the spout 354 help prevent the stream of water passing over the spout 354 from braiding. Reducing stream braiding can help reduce noise and splash associated with the stream of water. In particular examples, the edge of the spout 354 is rounded, which can also help reduce braiding. For example, producing the water dispensing portion 116 by injection molding may create a suitably rounded spout 354.

With reference to FIG. 3B, the lid 132 can be attached to or removed from the upper water dispensing portion 116. When attached to the water dispensing portion 116, the locking tabs 396 of the lid 132 extend through the locking slots of the upper dispensing portion 116. Outwardly extending prongs 398 of the locking tabs 396 normally engage the locking tabs 362 of the water dispensing portion 116, restricting removal of the lid 132. However, sufficient force, or squeezing of the lid 132 (and thus the tabs 396), allows the lid tabs 396 to slide past the locking tabs 362, allowing the lid 132 to be removed.

Figure 4:
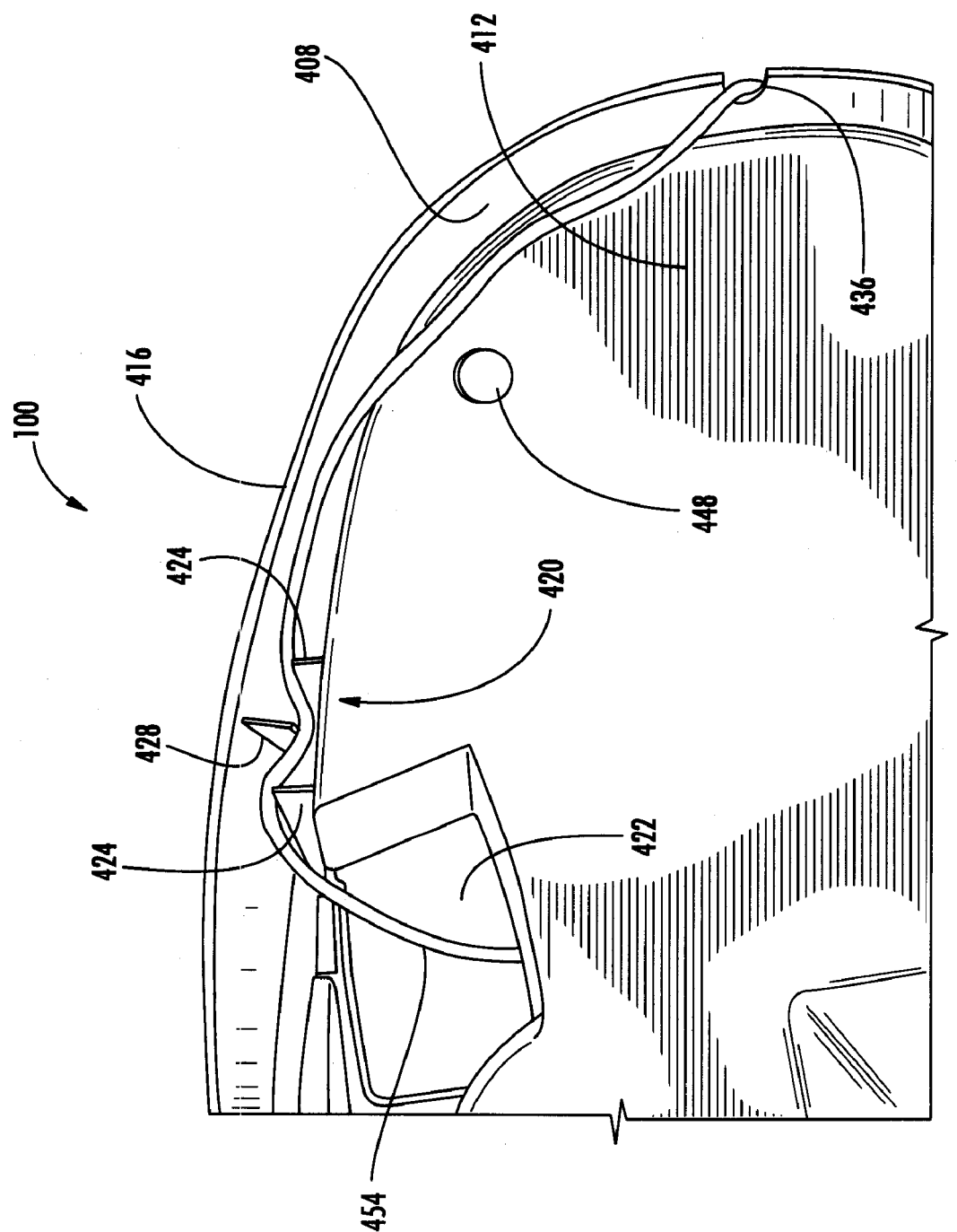
FIG. 4 is a bottom elevational view of the animal watering device of FIG. 1A.

FIG. 4 illustrates a bottom view of the animal watering device 100. A parabolic hollow area 408 extends between, and is defined by, the bottom 412 of the animal watering device 100 and the outer side 416 of the animal watering device 100.

A cord maze or guide 420 is located in the area 408 proximate the cord passage opening 422. The cord maze 420 is formed from three slots 424, 428 extending into the area 408. Two of the slots 424 are located on the outer surface of the water storage section 218 (FIG. 2A), the remaining slot 428 is located on the interior of the outer side 416, intermediate the other two slots 424. In further embodiments the cord maze is constructed differently or is omitted.

The outer side 416 includes a half obround indention 436 near the center of the underside of the back end of the animal watering device 100. Each outer lateral side of the area 408 includes scalloped sections. The scalloped sections extend slightly further out than the outer lateral side 416 and are concavely curved. The bottom surface 412 includes a plurality of feet 448 disposed on the bottom of the bowl and water storage sections.

The cord maze 420 and cord feedthrough 436 help secure the pump cord 454, and thus maintain an orderly appearance for the animal watering device 100, as well as reduce unnecessary exposure of the cord 454 to possible damage. The feet 448 can be used to help secure the animal watering device 100 from slipping or to help protect a surface on which the animal watering device 100 is placed.

FIG. 5 illustrates components of a pump and flow control mechanism 500 that may be used in the disclosed animal watering devices, such as the animal watering device 100. The mechanism 500 includes a pump 506 having a water diverting face 510. An impeller 514 extends into a pump cavity 516 formed in the water diverting face 510. A water outlet pipe section 520 extends from one end of the pump cavity 516. Channels are formed in at least a portion of each side of the pump 506 surrounding the water diverting face 510.

In some embodiments, the pump 506 includes a light, such as a lighting structure 522 shown in FIG. 5. The lighting structure 522 is generally circular and is attached to the pump 506 by a cord 524. The lighting structure 522 includes a plurality of lights 526. However, the lighting structure includes a single light in some examples. The lights 526 may be LED, incandescent, fluorescent, or any other suitable type of light source. In some examples, the lights 526 are disposed behind a housing (not shown) to protect the lights 526 from the operating environment, such as being disposed behind a waterproof housing. Although shown attached to the pump 506 by the cord 524, the lights 526 may be connected to the pump 506 in an alternative manner. In a particular example, the lights 526 are coupled to the body of the pump 506, such as being disposed on the top surface of the pump 506. In yet further examples the lights 526 or light structure 522 is not connected to the pump 506. A power cord 534 extends from the pump 506 and includes a quick connect inline plug section 538, having male 540 and female 542 connectors.

A pump cavity cover 546 is positionable over the pump cavity 516, having a rim 548 configured to fit within and abut the inner sides of the pump cavity 516. The pump cavity cover 546 includes a water inlet opening 550 in the center of a circular portion of the cover 546. A semicircular rim 554 projects perpendicularly outwardly from the outer surface of the portion of the cover 546 surrounding the opening 550. When the cover 546 fits within the cavity 516, water enters through the opening 550 and exits through the pipe section 520.

An obround pump filter cap 560 is securable to the water diverting face (a water intake end) 510 of the pump 506. The face of the filter cap 560 includes a flow control opening 564, slightly off center with respect to the filter cap 560. The flow control opening 564 is generally circular. A plurality of diagonally oriented obround slots 570 of varying lengths extend around and to the side of the flow control opening 564.

One end of a side of the cap 560 includes a semicircular water output pipe opening 572. The pipe opening 572 is configured to engage the water outlet pipe section 520. The inner surface of the sides of the cap 560 (not shown) include one or more perpendicularly extending obround ridges (not shown) configured to engage the channels around parts of the face 510 of the pump 506, such that the cap 560 snaps into place over the cover 546 and the face 510.

A flow control mechanism 578 is configured to engage the flow control opening 564. The flow control mechanism 578 includes a knob 580. A substantially planar handle 582 extends radially from the knob 580. A cylindrical shaft 584 extends axially from a planar surface 586 of the knob 580. The shaft 584 includes a narrowed portion proximate the knob 580 and a wider portion proximate a flow control end 594 of the shaft 584. A circular collar 592 extends around the shaft 584 proximate the flow control end 594. An aperture (not shown) of about 45° extends about the flow control end 594 of the shaft 584. A slight ridge extends about the flow control end 594 of the shaft 584 between the ends of the aperture. In further embodiments the flow control mechanism 578 is omitted or constructed differently than shown in FIG. 5.

In operation, a user can rotate the flow control mechanism 578 by gripping and moving the handle 582. As the flow control mechanism 578 is rotated, it changes the extent to which the aperture in the collar 592 of the shaft 584 is blocked by the rim. The shaft 584 is supported by the flow shaft support 234 and the shaft support tab 322 (FIG. 3A).

Water passes through the water inlet opening 550 after first passing through, and being filtered by, the slots 570 in the pump filter cap 560. The water then passes into the pump cavity 516 where it is driven into the outlet pipe section 520 by the impeller 514. After leaving the outlet pipe section 520, the water is forced into a conduit in the upper water dispensing portion 116 and through the water feed aperture into the tank 330 (FIG. 3A).

The flow control mechanism 578 is securable to the pump filter cap 560 through the ridge of the flow control end of 594 of the shaft 584 and the sides of the flow control opening 564 of the pump filter cap 560.

Regarding the pump power cord 534, the power cord 534 includes an inline quick connector 538. The connector 538 can be easily disengaged to allow the pump 506 to be removed or replaced, such as during cleaning or other maintenance.

The lighting structure 522 can be used to illuminate a portion of the device 100, such as the reservoir 110 (FIG. 1A). In a specific implementation, the lighting structure 522 is mountable on the lighting feature mount 280 (FIG. 2A). However, in further implementations, the lighting structure 522 is merely placed in the water storage section 218. In some examples, the reservoir 110 includes a cavity shaped to fit over a lighting structure, so as to facilitate light diffusion within the reservoir. For example, the bottom 152 of the reservoir 110 includes a cavity (not shown) shaped to fit over a lighting structure mounted in the base of the fountain.

Figure 6:
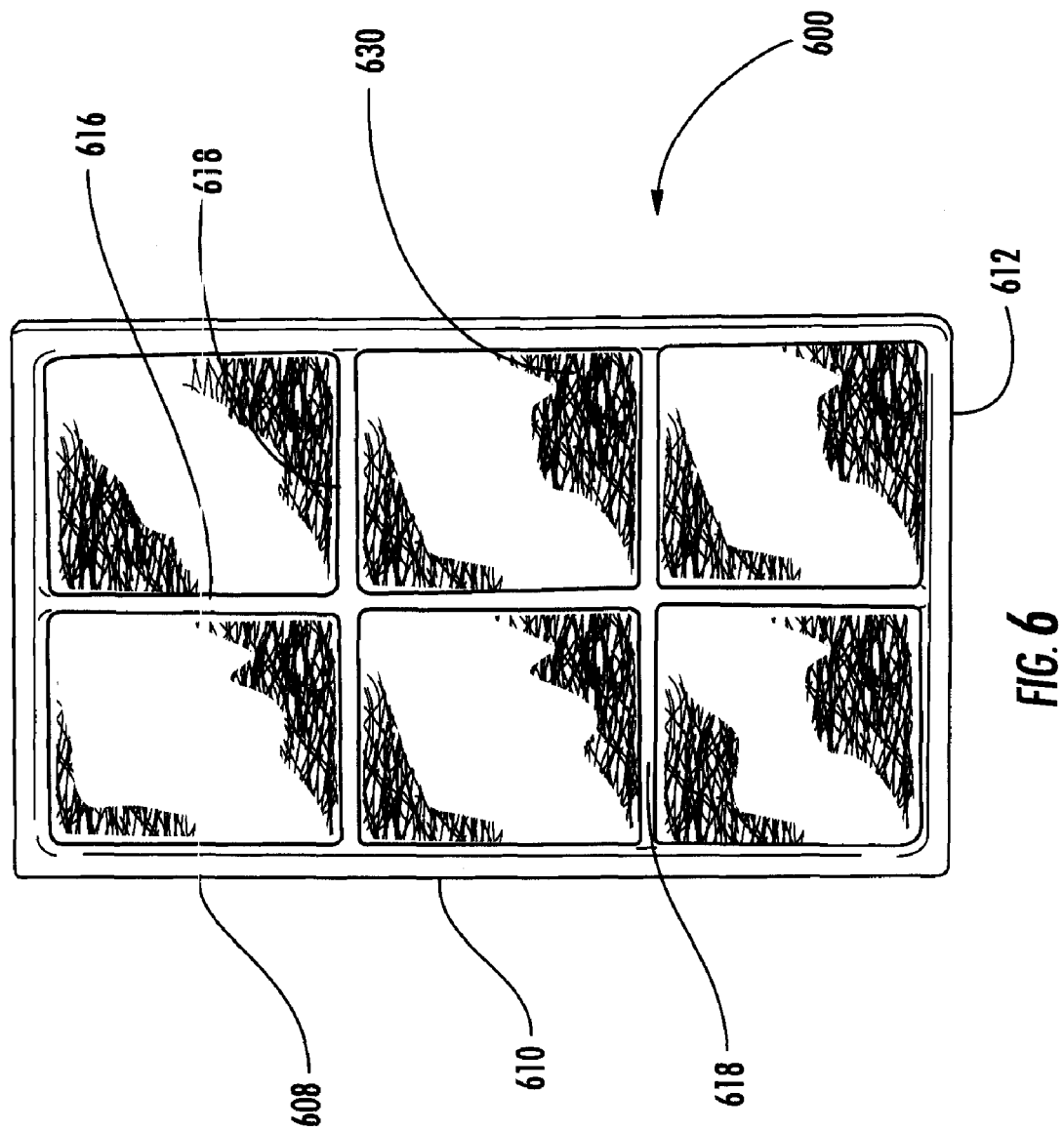
FIG. 6 is a front perspective view of a filter that can be used with the device of FIG. 1A.

FIG. 6 illustrates an impurity absorbing filter 600 that can be used with embodiments of the animal watering devices, such as the animal watering device 100. The filter 600 includes a rectangular frame 608 having longitudinal 610 and transverse 612 sides. A center support 616 extends longitudinally down the center of the frame 608 and two transverse supports 618 extend laterally across the frame 608, approximately a third of the distance from the transverse sides 612. Further embodiments of the filter 600 include more or less supports or the supports are oriented differently. The filter 600 is not rectangularly shaped in yet further embodiments.

The filter 600 has faces 630 on the front and back planes of the filter 600. Each face 630 is covered by material such as filter material made of natural or synthetic fiber material. The faces 630 may enclose or otherwise contain filter media, such as containing or being impregnated with activated carbon. In FIG. 6, the material is divided into six compartments by the frame 608. Filter media (not shown), such as activated carbon, can be placed between the material covering faces 630 on the front and back of the filter 600 and retained in a particular compartment by the frame 608. Although the filter 600 is shown with six compartments, the frame 608 can be designed to provide more or fewer compartments. In a particular example, the frame is configured to divide the filter 600 into two compartments.

Dividing the filter 600 into multiple compartments can help distribute filter material throughout the filter 600 to help provide more efficient filtering. In prior filters, filter material often sank to the bottom of the filter, such that only a portion of water passing through the filter contacted filter media. By preventing or reducing such settling, the disclosed filter 600 can help provide filter material in more regions of the filter 600, allowing more of the water passing through the filter 600 to contact filter media.

It can thus be seen that embodiments of the present disclosure can provide animal watering devices having a number of advantages. For example, disclosed watering devices can be easy to clean and maintain, such as by having parts which are easily removed or replaced. For example, certain devices include an easily removable debris filter, which may be a prefilter that helps trap debris before water passes to the pump and/or one or more additional filters. Further devices include an improved water flow control system that helps make the device easier to assemble and disassemble. Some configurations include a snap-on lid that can be easily removed, but which is secured against accidental removal or removal by a pet.

In particular examples, disclosed watering devices produce streams of falling water that produce relatively little splash and noise, such as streams having reduced braiding.

The disclose devices may include features that provide an improved pump, pump power cord or an improved interface between the pump, cord, or watering device. For example, the cord may be a low voltage cord, which may reduce or eliminate damage or injury caused by wear or damage to the cord. Certain cords are of a length that provides for reasonable positioning of the animal watering device, but avoids excess cord that can create electrical danger or a disorganized appearance. Further embodiments include a submersible pump, which may operate more quietly than non-submersible pumps.

Particular embodiments provide animal watering devices having reservoirs that may be secured to the animal watering device or that can be made in a variety of shapes. Certain reservoirs include a carrying handle. In yet further implementations, the reservoirs include features that help prevent water from spilling from the reservoir during removal, filling, and replacement of the reservoir.

Some configurations of the animal watering device include feet that may help prevent the animal watering device from slipping or from damaging a surface on which the device is placed.

The present disclosure also provides impurity-absorbing filters that contain filtering media more evenly distributed through the filter, such as filters having filtering media disposed in a number of compartments. Such filters can increase the contact between water and filtering media, potentially improving water quality.

Some devices of the present disclosure include a lighting feature. The lighting feature may be used to make the device more aesthetically pleasing or for safety, such as to provide illumination for a pet or the pet's owner, to aid in locating the device in low-light conditions, or to aid in seeing in the vicinity of the device in low-light conditions. Although described as attached to the pump, the light may be located elsewhere on the device and may illuminate portions of the device other than, or in addition to, the reservoir.

The light may be colored or clear. When multiple lights are used, the lights may be the same or different type, including being of the same or different color. In some configurations the lights are static, while in other configurations the light or lights change over time, such as displaying different colors, changing intensity, blinking, or moving.

In yet further embodiments, an additional light feature is included in the device. In some examples a fiber optic structure, such as one or more fiberglass threads, are optically coupled to the light. In another example, the light is covered with a decorative structure, which may be in the shape of a particular figure, such as an animal, or a geometric shape. Or, the device (e.g., the reservoir) includes a structure or cavity that provides an additional light feature, such as a decorative feature. In some configurations the decorative structure includes sections having different colors or other illuminative properties, such as different transparencies. The additional light feature is stationary in some embodiments, while in further embodiments, the light feature may move relative to the light.

It is to be understood that the above discussion provides a detailed description of various embodiments. The above descriptions will enable those skilled in the art to make many departures from the particular examples described above to provide apparatuses constructed in accordance with the present disclosure. The embodiments are illustrative, and not intended to limit the scope of the present disclosure. The scope of the present disclosure is rather to be determined by the scope of the claims as issued and equivalents thereto.

We claim:

1. A fountain device for household pets, the device comprising:
    (A) a base, the base defining a bowl portion;
    (B) a dispensing portion adapted for fluid communication with the bowl portion, the dispensing portion defining a spout with a bottom spout wall, extending from a rearward portion of the spout to a forward lip portion of the spout, and at least two flow guide walls extending upwardly from the bottom spout wall from the rearward portion of the spout toward the forward lip portion of the spout; and
    (C) a pump positioned to be in fluid communication with the bowl portion of the base and the dispensing portion;
    the at least two flow guide walls being positioned to converge toward one another from the rearward portion of the spout to the forward lip portion of the spout whereby fluid is directed to the lip portion of the spout and braiding of the fluid is reduced as it passes over the lip portion of the spout and into the bowl portion as a single free-falling stream.

2. The device of claim 1, wherein the spout is arcuately shaped between the at least two flow guides, within a fluid pathway from which the fluid passes into the bowl portion as a free-falling stream; the arcuate shape of the spout and the at least two flow guide walls being oriented with respect to one another such that braiding of the fluid is reduced as the fluid passes over the lip portion of the spout.

3. The device of claim 1, wherein the dispensing portion comprises a plurality of sides, the spout extending from at least one of the plurality of sides, wherein the at least one side is concavely curved underneath the spout, from at least the rearward portion of the spout toward the forward lip portion of the spout, and an upper surface of the bottom spout wall is convexly curved within a fluid pathway from which the fluid passes through the spout.

4. The device of claim 1, wherein the spout defines a lip, the lip being convexly curved.

5. The device of claim 1, wherein the at least two guide walls extend from the rearward portion of the spout toward the forward lip portion of the spout terminate prior to the lip portion.

* * * * *